United States Patent
Funaki

(10) Patent No.: US 8,089,544 B2
(45) Date of Patent: Jan. 3, 2012

(54) IMAGE SENSOR AND DRIVING METHOD THEREFOR

(75) Inventor: Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 12/402,117

(22) Filed: Mar. 11, 2009

(65) Prior Publication Data
US 2009/0244346 A1    Oct. 1, 2009

(30) Foreign Application Priority Data
Mar. 26, 2008 (JP) .................................. 2008-80584

(51) Int. Cl.
*H04N 5/335* (2006.01)
(52) U.S. Cl. ........................ 348/308; 348/294
(58) Field of Classification Search .................. 348/294, 348/308, 296, 297; 250/208.1; 257/290–292
See application file for complete search history.

(56) References Cited

U.S. PATENT DOCUMENTS

| | | | | |
|---|---|---|---|---|
| 6,583,817 | B1 * | 6/2003 | Lee | 348/241 |
| 7,456,885 | B2 * | 11/2008 | Baker | 348/308 |
| 2005/0253937 | A1 * | 11/2005 | Moholt et al. | 348/229.1 |

FOREIGN PATENT DOCUMENTS

| | | |
|---|---|---|
| JP | 2005-303648 | 10/2005 |
| JP | 2005-323331 | 11/2005 |

* cited by examiner

*Primary Examiner* — Mohammed Hasan
(74) *Attorney, Agent, or Firm* — Oblon, Spivak, McClelland, Maier & Neustadt, L.L.P.

(57) ABSTRACT

This disclosure concerns an image sensor including: an imaging area; row selection lines; and column signal lines, wherein a pixel includes: a photodiode; a capacitor connected to the photodiode at a first node; a reset transistor connected between the first node and a first power supply; a comparator comparing the potential of the first node with a reference voltage, and outputting a result to a gate of the reset transistor; a counter connected to the comparator, counting an inversion count of an output signal from the comparator, and outputting a digital value according to the inversion count, the output signal being generated from the comparator when the potential of the first node reaches the potential of the first power supply; and a selection transistor connected between the counter and one of the plurality of column signal lines, and having a gate connected to one of the row selection lines.

12 Claims, 3 Drawing Sheets

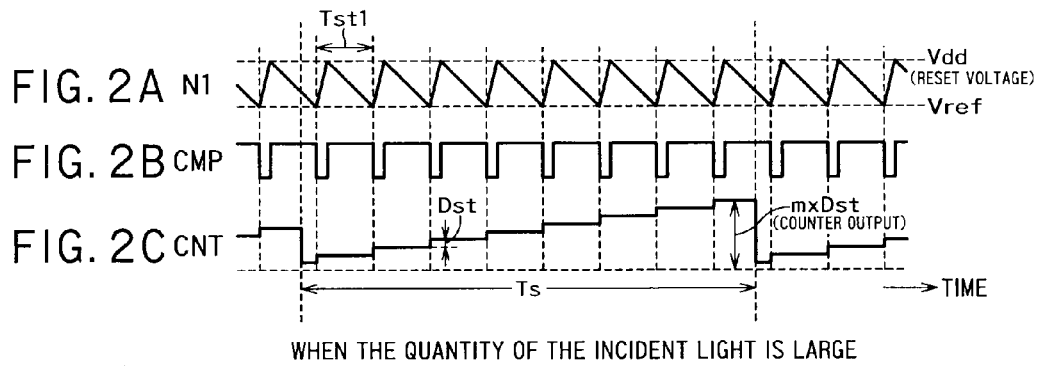
WHEN THE QUANTITY OF THE INCIDENT LIGHT IS LARGE
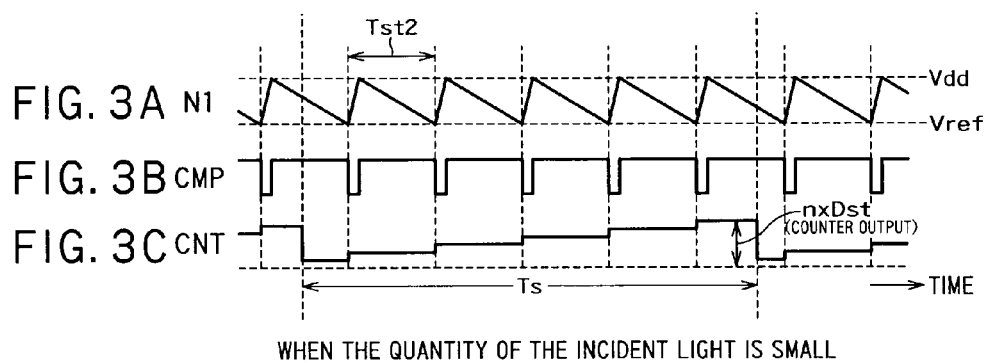
WHEN THE QUANTITY OF THE INCIDENT LIGHT IS SMALL
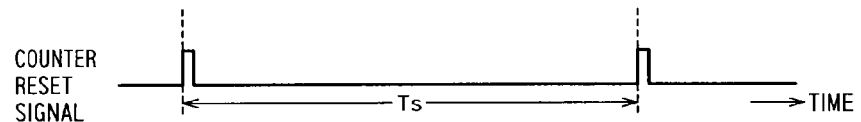
FIG. 4

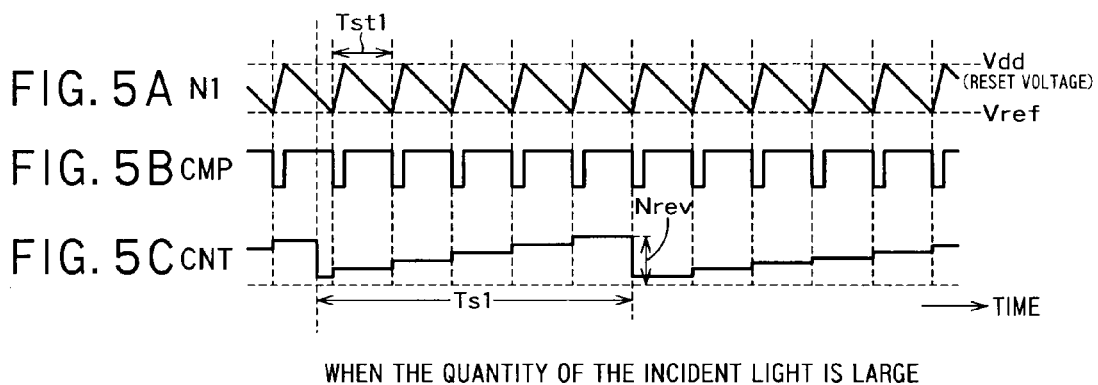
WHEN THE QUANTITY OF THE INCIDENT LIGHT IS LARGE
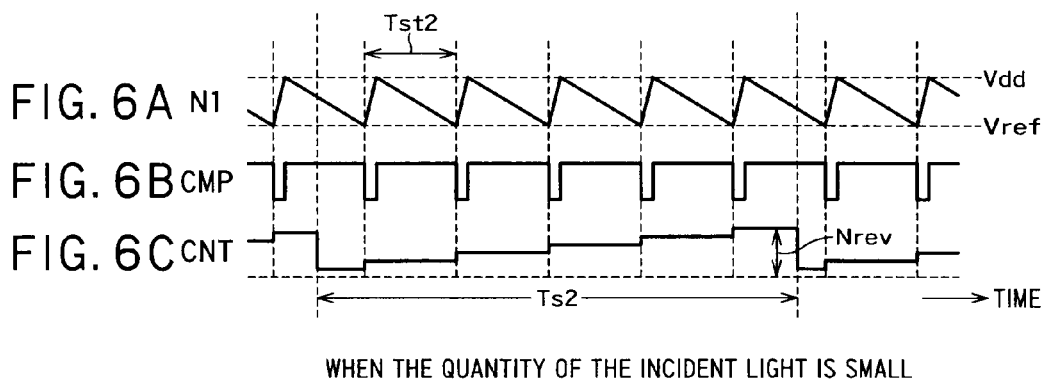
WHEN THE QUANTITY OF THE INCIDENT LIGHT IS SMALL
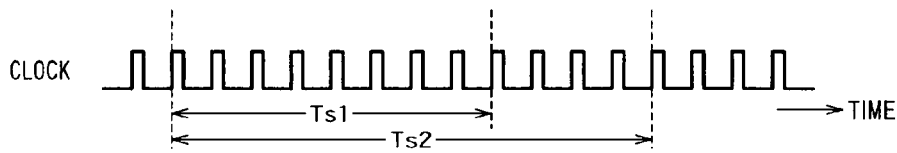
FIG. 7

IMAGE SENSOR AND DRIVING METHOD THEREFOR

CROSS-REFERENCE TO RELATED APPLICATION

This application is based upon and claims the benefit of priority from the prior Japanese Patent Application No. 2008-80584, filed on Mar. 26, 2008, the entire contents of which are incorporated herein by reference.

BACKGROUND OF THE INVENTION

1. Field of the Invention

The present invention relates to an image sensor and an image sensor driving method, and the present invention relates to, for example, a CMOS image sensor and a CMOS image sensor driving method.

2. Related Art

Development of a CMOS (Complimentary Metal-Oxide Semiconductor) image sensor has been underway as an image sensor expected to replace a CCD (Charge-Coupled Device). The CMOS image sensor at low voltage with advanced function can be realized since both a logic circuit and an analog circuit can be formed integrally on the same chip (system integration can be made). On the other hand, the CMOS image sensor has a problem that global exposure cannot be performed differently from the CCD since signals are accumulated to correspond to pixels and read in series.

In recent years, a combination of column parallel A/D conversion and digital CDS (correlation double sampling) has enabled high speed imaging and low noise reading. However, even with the column-parallel digital-CDS A/D conversion technique, if power supply voltage falls, a D/A conversion lamp wave employed in A/D conversion cannot be sufficiently made large because of adoption of microfabrication process. This disadvantageously causes deterioration in S/N ratio.

SUMMARY OF THE INVENTION

An image sensor according to an embodiment of the present invention comprises an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction, wherein each of the pixels or each of a plurality of pixel blocks including the pixels includes:

a photodiode carrying a current according to the incident light;

a capacitor connected to one end of the photodiode at a first node, and applying a potential to the first node;

a reset transistor connected between the first node and a first power supply, and resetting a potential of the first node to a potential of the first power supply;

a comparator comparing the potential of the first node with a reference voltage, and outputting a comparison result to a gate of the reset transistor;

a counter connected to an output end of the comparator, counting an inversion count of an output signal from the comparator, and outputting a digital value according to the inversion count, the output signal being generated from the comparator when the potential of the first node reaches the potential of the first power supply; and a selection transistor connected between an output of the counter and one of the plurality of column signal lines, and having a gate connected to one of the plurality of row selection lines.

An image sensor according to an embodiment of the present invention comprises an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction, wherein each of the pixels or each of a plurality of pixel blocks including the pixels includes:

a photodiode carrying a current according to the incident light;

a capacitor connected to one end of the photodiode at a first node, and applying a potential to the first node;

a reset transistor connected between the first node and a first power supply, and resetting a potential of the first node to a potential of the first power supply;

a comparator comparing the potential of the first node with a reference voltage, and outputting a comparison result to a gate of the reset transistor;

a counter connected to an output end of the comparator and receiving clocks having regularly repetitive amplitudes, the counter counting an inversion count of an output signal from the comparator and counting the clocks received by time the inversion count reaches a predetermined number, the counter outputting a digital value according to the clock count, the output signal being generated from the comparator when the potential of the first node reaches the potential of the first power supply; and a selection transistor connected between an output of the counter and one of the plurality of column signal lines, and having a gate connected to one of the plurality of row selection lines.

A method of driving an image sensor according to an embodiment of the present invention, the image sensor including an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction, each of the pixels or each of a plurality of pixel blocks including the pixels including: a photodiode; a capacitor connected to one end of the photodiode at a first node; a reset transistor connected between the first node and a first power supply; a comparator receiving the potential of the first node with a reference voltage and having an output connected to a gate of the reset transistor; a counter connected to an output end of the comparator; and a selection transistor connected between an output of the counter and one of the plurality of column signal lines and having a gate connected to one of the plurality of row selection lines, the method comprises:

causing the photodiode to emit charges according to the incident light;

inverting an output signal from the comparator when the potential of the first node reaches a potential of the first power supply;

causing the counter to count an inversion count of the output signal from the comparator and to output a digital value according to the inversion count, and simultaneously making the reset transistor conductive to reset the potential of the first node to the potential of the first power supply and to return the output signal from the comparator to an original level;

causing the counter not to increase the digital value to make the reset transistor nonconductive, when the output signal from the comparator is returned to the original level; and outputting the digital value.

A method of driving an image sensor according to an embodiment of the present invention, the image sensor including an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction, each of the pixels or each of a plurality of pixel blocks including the pixels including: a photodiode; a capacitor connected to one end of the photodiode at a first node; a reset transistor connected between the first node and a first power supply; a comparator receiving the potential of the first node with a reference voltage and having an output connected to a gate of the reset transistor; a counter connected to an output end of the comparator and receiving clocks having regularly repetitive amplitudes; and a selection transistor connected between an output of the counter and one of the plurality of column signal lines and having a gate connected to one of the plurality of row selection lines, the method comprises:

causing the photodiode to emit charges according to the incident light;

inverting an output signal from the comparator when the potential of the first node reaches a potential of the first power supply;

causing the counter to count an inversion count of the output signal from the comparator and to count the clocks received by time the inversion count reaches a predetermined number, and making the reset transistor conductive simultaneously with the inversion of the output of the comparator;

resetting the potential of the first node to the potential of the first power supply to return the output signal from the comparator to an original level;

causing the counter not to increase the digital value to make the reset transistor nonconductive, when the output signal from the comparator is returned to the original level; and causing the counter to output the digital value according to the number of the clocks received by time the inversion count reaches a predetermined number.

BRIEF DESCRIPTION OF THE DRAWINGS

FIGS. 2A to 2C are timing charts showing an operation of the image sensor according to the first embodiment;

FIGS. 3A to 3C are timing charts showing an operation of the image sensor according to the first embodiment;

FIG. 4 is a timing chart showing an operation of the image sensor according to the first embodiment;

FIGS. 5A to 5C are timing charts showing an operation of the image sensor according to a second embodiment;

FIGS. 6A to 6C are timing charts showing an operation of the image sensor according to the second embodiment; and FIG. 7 is a timing chart showing an operation of the image sensor according to the second embodiment.

DETAILED DESCRIPTION OF THE INVENTION

Figure 1:
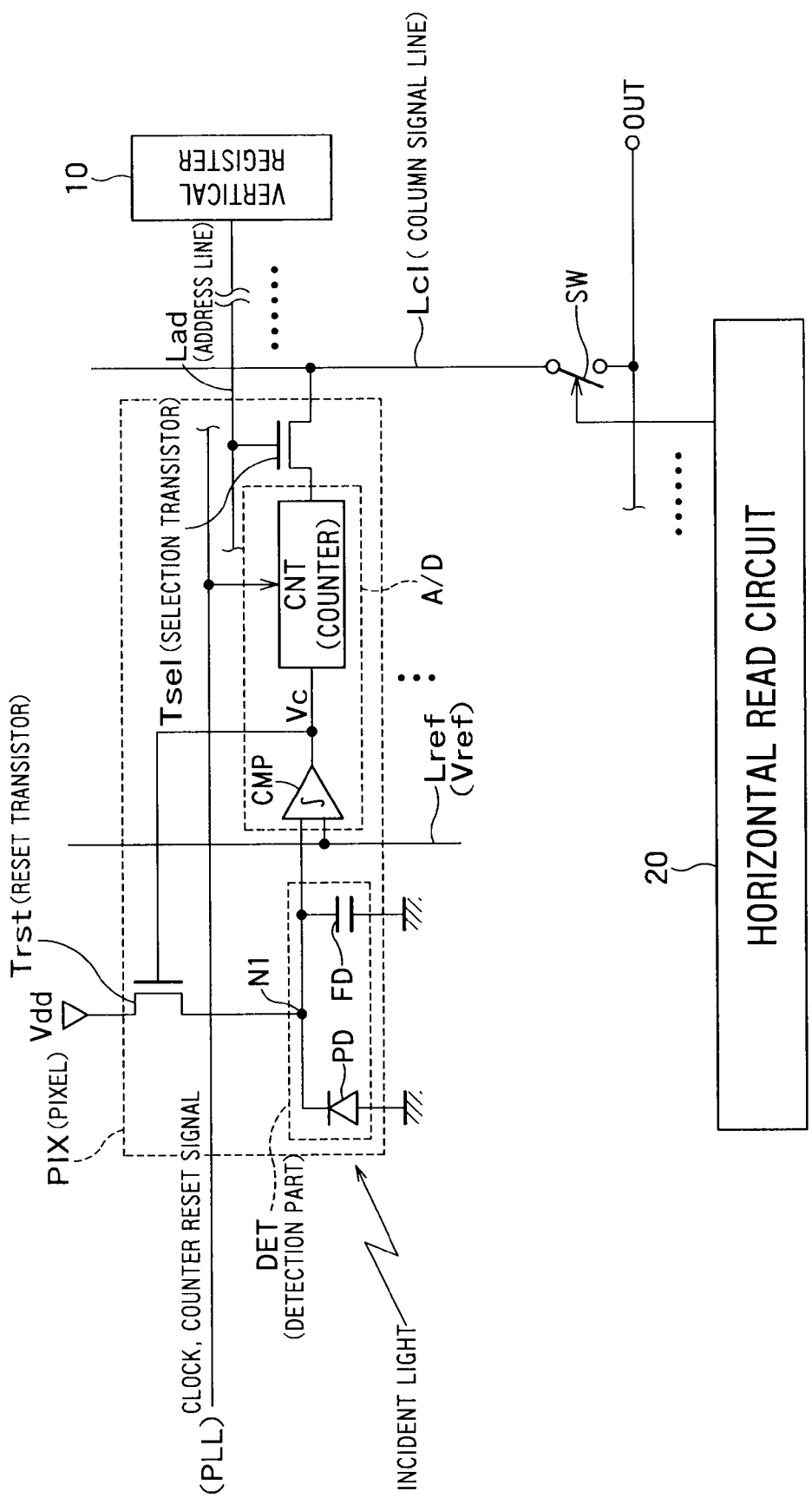
FIG. 1 is a circuit diagram showing a pixel and a peripheral portion in a CMOS image sensor according to a first embodiment.

Embodiments of the present invention will be explained below in detail with reference to the accompanying drawings. Note that the invention is not limited thereto.

First Embodiment

An image sensor shown in FIG. 1 is a CMOS image sensor. While FIG. 1 shows only one pixel PIX, a plurality of pixels PIXs is actually arranged two-dimensionally on a semiconductor substrate (not shown) in a matrix. The pixels PIXs arranged in a matrix form an imaging region.

One address line Lad serving as one row selection line is connected to a plurality of pixels PIXs arranged in a row direction. A plurality of address lines Lads is connected to a vertical register 10. The vertical register 10 is configured to select one address line Lad in a certain row in order of row addresses and to apply a voltage to a plurality of pixels PIXs connected to each selected address line Lad.

One vertical signal line Lc1 is connected to a plurality of pixels PIXs arranged in a column direction. A plurality of vertical signal lines Lc1s is connected to an output terminal OUT via switches SWs, respectively. Each switch SW is connected to a horizontal read circuit 20 and turned on according to an order of a column address of the corresponding vertical signal line Lc1.

The horizontal read circuit 20 reads digital data stored in a plurality of pixels PIXs arranged in the row selected by the address line Lad as described above from the output terminal OUT in series. The vertical register 10 selects the address lines Lads according to the order of addresses of the address lines Lads. All the pixels PIXs in the imaging region are thereby output from the output terminal OUT in series.

The vertical register 10 and the horizontal read circuit 20 can be formed on the same semiconductor substrate as that on which the imaging region is formed.

Each of the pixels PIXs includes a photodiode PD, a capacitor FD, a reset transistor Trst, a comparator CMP, a counter CNT, and a selection transistor Tsel.

An anode of the photodiode PD is connected to, for example, a ground serving as a second power supply and a cathode thereof is connected to one end of the capacitor FD. The photodiode PD receives an incident light and emits a current according to the incident light. For example, the photodiode PD carries electrons in a quantity proportional to a quantity of light (or an illuminance, a brightness, etc.) of the incident light from the anode to the cathode. Alternatively, the photodiode PD carries a current in an amount proportional to the quantity of light (or the illuminance, the brightness, etc.) from the cathode to the anode. Namely, the amount of the current carried by the photodiode PD for certain time is larger as the quantity of light, the illuminance, the brightness, gradation or the like is larger or higher.

The capacitor FD is connected between the cathode of the photodiode PD and the ground. It suffices that the capacitor FD has a floating diffusion type capacity and is formed by a depleted layer obtained by applying a reverse bias to a PN junction diode. The capacitor FD can hold a potential of a first node N1 in a state of absence of the incident light. If there is no need to hold the potential of the node N1, it is possible to dispense with the capacitor FD. Further, if a read gate is arranged between the photodiode PD and the capacitor FD, reset signal noise can be reduced.

If the first node N1 is defined as a node between the cathode of the photodiode PD and the capacitor FD, the photodiode PD and the cathode FD are connected in parallel between the first node N1 and the ground and constitute a detection unit DET detecting the incident light.

The reset transistor Trst is connected between the first node N1 and a first power supply and functions to reset the potential of the first node N1 to a first power supply potential Vdd (to charge the first node N1 to set the potential of the first node N1 to the first power supply potential Vdd).

The comparator CMP includes a first input unit connected to the first node N1, a second input unit connected to a reference voltage line Lref, and an output unit outputting a comparison result between the first node N1 and the reference voltage line Lref. The output unit of the comparator CMP is connected to the counter CNT and to a gate of the reset transistor Trst in common. The comparator CMP compares the potential of the first node N1 with a reference voltage Vref and outputs the comparison result.

The counter CNT counts the number of times of inversion (calculates an "inversion count") whenever an output signal from the comparator CMP falls from a high level potential to a low level potential. In this case, the counter CNT does not calculate the inversion count when the output signal from the comparator CMP rises from the low level potential to the high level potential. Conversely, the counter CNT can calculate the inversion count whenever the output signal from the comparator CMP rises from the low level potential to the high level potential. In this case, the counter CNT does not calculate the inversion count when the output signal from the comparator CMP falls from the high level potential to the low level potential. Even with the latter configuration, the counter CNT can output the same digital signal as that with the former configuration.

In the first embodiment, it is premised that the reference voltage Vref is constant to all the cells. Alternatively, for example, different reference voltages Vref can be applied according to the quantity of the incident light, whereby dynamic range can be enlarged. In addition, the reference voltage Vref can be a temporally changing value.

The comparator CMP and the counter CNT constitute an A/D converter.

The reset transistor Trst is made conductive whenever, for example, the output signal from the comparator CMP falls from the high level potential to the low level potential. The reset transistor Trst thereby resets the potential of the first node N1 to the first power supply potential Vdd. In this case, the reset transistor Trst is kept nonconductive and does not reset the potential of the first node N1 to the first power supply potential Vdd when the output signal from the comparator CMP rises from the low level potential to the high level potential.

The selection transistor Tsel is connected between the output unit of the counter CNT and one vertical signal line Lc1. A gate of the selection transistor Tsel is connected to one address line Lad. If the vertical transistor 10 selects and drives the address line Lad connected to the selection transistor Tsel, then the selection transistor Tsel becomes conductive and the digital signal output from the counter CNT is transmitted to the vertical signal line Lc1 connected to the selection transistor Tsel. When the horizontal read circuit 20 turns on the switch SW corresponding to the vertical signal line Lc1, this digital signal is output from the output terminal OUT via the switch SW.

FIGS. 2A to 2C are timing charts when the quantity of the incident light is large. FIGS. 3A to 3C are timing charts when the quantity of the incident light is small. In the first embodiment, the counter CNT calculates the inversion count of the output from the comparator CMP within a certain time Ts and outputs a digital value proportional to the inversion count.

If the potential of the first node N1 is lower than the reference voltage Vref, the comparator CMP outputs a low level potential. The reset transistor Trst is thereby made conductive and, therefore, resets the potential of the first node N1 to the first power supply potential Vdd. Since the first power supply potential Vdd is higher than the reference voltage Vref, the comparator CMP outputs a high level potential. The reset transistor Trst is thereby made nonconductive. Namely, as shown in FIG. 2A, if the potential of the first node N1 reaches the reference voltage Vdd and is to fall from the reference voltage Vdd, the potential of the first node N1 is returned (reset) to the first power supply potential Vdd.

The photodiode PD carries electrons from the anode to the cathode when receiving the incident light. Accordingly, if the incident light is incident on the photodiode PD, then charges held in the capacitor FD are emitted via the photodiode PD and the potential of the first node N1, therefore, falls. If the quantity of the incident light is larger, the potential of the first node N1 falls in shorter time.

As shown in FIG. 2B, when the potential of the first node N1 reaches the reference voltage Vref, the output from the comparator CMP falls from high level to low level. Namely, the output signal from the comparator CMP is inverted. At the same time, the reset transistor Trst is made conductive and charges the first node N1 so that the potential of the first node N1 is equal to the first power supply potential Vdd. The charges charged on the first node N1 at this time are accumulated in the capacitor FD. As a result of rising of the potential of the first node N1, the output signal from the comparator CMP is returned (reset) to the original high level potential right after inversion from the high level to the low level.

It is assumed that a period from the time when the potential of the first node N1 reaches the reference voltage Vref to the next time when the potential of the first node N1 reaches the reference voltage Vref (a period from one inversion to next inversion of the output signal from the comparator CMP) is a step period Tst1 or Tst2.

As shown in FIGS. 2C and 3C, the counter CNT increases the inversion count when the output signal from the comparator CMP is inverted. Namely, the counter CNT increases the digital value by a predetermined step value Dst at intervals of the step period Tst1. If the number of steps is set to, for example, eight gradations, the step value Dst is a value obtained by dividing an output maximum voltage Vmax by eight.

The inversion count calculated by the counter CNT and the digital value output from the counter CNT are reset whenever a counter reset signal shown in FIG. 4 is activated. The counter reset signal is activated at intervals of a predetermined period Ts (Ts>Tst1, Ts>Tst2). During the period Ts, the counter CNT accumulates the inversion counts and the digital values.

As shown in FIGS. 2A to 2C, when the quantity of the incident light or the like is relatively large or high, the photodiode PD carries relatively high current and a falling speed of the potential of the first node N1 is, therefore, high. Accordingly, the step period Tst1 is shorter than the step period Tst2, and the number of step periods Tst1 and the number of inversion counts within the predetermined period Ts are relatively large. If the number of step periods Tst1 included in the predetermined period Ts is, for example, m, the digital value output from the counter CNT is m×Dst, where m is an integer.

As shown in FIGS. 3A to 3C, when the quantity of the incident light or the like is relatively small or low, by contrast, the photodiode PD carries relatively low current and the falling speed of the potential of the first node N1 is, therefore, low. Accordingly, the step period Tst2 is longer than the step period Tst1, and the number of step periods Tst2 and the number of inversion counts within the predetermined period Ts are relatively small. If the number of step periods Tst2 included in the predetermined period Ts is, for example, n, the digital value output from the counter CNT is n×Dst (n×Dst<m×Dst), where n is an integer smaller than m.

As can be seen, the counter CNT can output the digital value according to the quantity of the incident light.

According to the first embodiment, the A/D converter constituted by the comparator CMP and the counter CNT is incorporated in each pixel PIX. It is thereby possible to convert an analog signal of the pixel PIX into a digital signal within the pixel PIX. Since the A/D conversion is performed in the pixel PIX, there is no need to provide an amplifier amplifying the analog signal. As a result, an S/N ratio can be improved. Furthermore, a memory such as an SRAM, a DRAM or a flash memory can be mounted in the counter CNT. In this case, data can be stored in the memory per pixel and an advanced digital signal processing can be realized at real time.

According to the first embodiment, the A/D converter constituted by the comparator CMP and the counter CNT is incorporated in each pixel PIX. Alternatively, the imaging region can be divided into a plurality of pixel blocks each including a plurality of pixels PIXs and the A/D converter can be provided to correspond to each of the pixel blocks. In this alternative, similarly to the first embodiment, it is preferable to provide A/D converters in the imaging region. This is because the amplifier can be dispensed with and the S/N ratio can be improved by providing the A/D converters in the imaging region. This can eventually accelerate an image signal processing rate.

According to the first embodiment, the A/D conversion can be performed per pixel PX, so that global exposure reading that is difficult to perform by the column A/D conversion can be performed.

Second Embodiment

According to the first embodiment, the counter CNT outputs the counter output within the predetermined period Ts as the digital value. According to a second embodiment, by contrast, the counter CNT receives a clock having regularly repetitive amplitudes and measures time by the time the inversion count reaches a predetermined number. Namely, the counter CNT counts the number of amplitudes of the clock (calculates a "clock count") by the time the inversion count reaches the predetermined number and outputs a digital value according to the clock count.

FIGS. 5A to 5C are similar to FIGS. 2A to 2C, respectively. FIGS. 6A to 6C are similar to FIGS. 3A to 3C, respectively. Namely, operations performed by the comparator CMP, the reset transistor Trst, and the detection unit DET according to the second embodiment are similar to those according to the first embodiment. Therefore, explanations of those operations according to the second embodiment will be omitted.

As shown in FIGS. 5C and 6C, the counter CNT calculates an inversion count by which the output signal from the comparator CMP is inverted from high level to low level. Furthermore, the counter CNT receives a clock having regularly repetitive amplitudes as shown in FIG. 7 and calculates the number of amplitudes of the clock (hereinafter, "clock count"). The counter CNT outputs a digital value according to the clock count when the inversion count reaches a predetermined number Nrev.

As shown in FIGS. 5A to 5C, when the quantity of the incident light is large, the inversion count reaches the predetermined number Nrev relatively in short time Ts1. Due to this, the clock count calculated by the counter CNT within the time Ts1 is small. It suffices that the counter CNT outputs the digital value proportional to this clock count.

As shown in FIGS. 6A to 6C, when the quantity of the incident light is small, the inversion count reaches the predetermined number Nrev in longer time Ts2 than the time Ts1. Due to this, the clock count calculated by the counter CNT within the time Ts2 is relatively large. The counter CNT outputs the digital value proportional to this clock count. The counter CNT can thereby output the digital value according to the quantity of the incident light.

The configuration of the second embodiment can be similar to that of the first embodiment. However, if the predetermined number Nrev is set to a value so that a counter of k bits (where k is an integer) counts up to k, the counter reset signal can be dispensed with. In this case, after the inversion count reaches the predetermined number Nrev (Nrev="111 . . . 1" (all of k bits are 1), the inversion count of the counter is automatically reset to "000 . . . 0".

The second embodiment can attain the same effects as those of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image sensor comprising:
   an imaging area including a plurality of pixels arranged in a matrix on a semiconductor substrate and detecting an incident light;
   a plurality of row selection lines each connected to the pixels arranged in the row direction; and
   a plurality of column signal lines each connected to the pixels arranged in a column direction, wherein
   each of the pixels or each of a plurality of pixel blocks including the pixels includes:
   a photodiode carrying a current according to the incident light;
   a capacitor connected to one end of the photodiode at a first node, and applying a potential to the first node;
   a reset transistor connected between the first node and a first power supply, and resetting a potential of the first node to a potential of the first power supply;
   a comparator comparing the potential of the first node with a reference voltage, and outputting a comparison result to a gate of the reset transistor;
   a counter connected to an output end of the comparator, counting an inversion count of an output signal from the comparator, and outputting a digital value according to the inversion count, the output signal being generated from the comparator when the potential of the first node reaches the potential of the first power supply; and
   a selection transistor connected between an output of the counter and one of the plurality of column signal lines, and having a gate connected to one of the plurality of row selection lines.

2. The image sensor according to claim 1, wherein
   when the incident light is incident on the photodiode to invert the output signal from the comparator, the counter increases the inversion count, and the reset transistor is made conductive and resets the potential of the first node to the potential of the first power supply, and when the potential of the first node is reset to the potential of the first power supply to return the output signal from the comparator to an original level, the reset transistor is made nonconductive.

3. The image sensor according to claim 1, wherein when a quantity of the incident light is large and a quantity of charges emitted from the photodiode is large, the inversion count counted by the counter for certain time is large, and when the quantity of the incident light is small and the quantity of charges emitted from the photodiode is small, the inversion count counted by the counter for the certain time is small.

4. The image sensor according to claim 2, wherein when a quantity of the incident light is large and a quantity of charges emitted from the photodiode is large, the inversion count counted by the counter for certain time is large, and when the quantity of the incident light is small and the quantity of charges emitted from the photodiode is small, the inversion count counted by the counter for the certain time is small.

5. The image sensor according to claim 3, wherein the counter counts the inversion count at intervals of the certain time, and resets the inversion count and the digital value after the certain time.

6. The image sensor according to claim 4, wherein the counter counts the inversion count at intervals of the certain time, and resets the inversion count and the digital value after the certain time.

7. An image sensor comprising:
an imaging area including a plurality of pixels arranged in a matrix on a semiconductor substrate and detecting an incident light;
a plurality of row selection lines each connected to the pixels arranged in the row direction; and
a plurality of column signal lines each connected to the pixels arranged in a column direction, wherein
each of the pixels or each of a plurality of pixel blocks including the pixels includes:
a photodiode carrying a current according to the incident light;
a capacitor connected to one end of the photodiode at a first node, and applying a potential to the first node;
a reset transistor connected between the first node and a first power supply, and resetting a potential of the first node to a potential of the first power supply;
a comparator comparing the potential of the first node with a reference voltage, and outputting a comparison result to a gate of the reset transistor;
a counter connected to an output end of the comparator and receiving clocks having regularly repetitive amplitudes, the counter counting an inversion count of an output signal from the comparator and counting the clocks received by time the inversion count reaches a predetermined number, the counter outputting a digital value according to the clock count, the output signal being generated from the comparator when the potential of the first node reaches the potential of the first power supply; and
a selection transistor connected between an output of the counter and one of the plurality of column signal lines, and having a gate connected to one of the plurality of row selection lines.

8. The image sensor according to claim 7, wherein when a quantity of the incident light is large and a quantity of charges emitted from the photodiode is large, the clock count by the time the inversion count reaches a predetermined number is small, and when the quantity of the incident light is small and the quantity of charges emitted from the photodiode is small, the clock count by the time the inversion count reaches the predetermined number is large.

9. A method of driving an image sensor, the image sensor including an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction,
each of the pixels or each of a plurality of pixel blocks including the pixels including: a photodiode; a capacitor connected to one end of the photodiode at a first node; a reset transistor connected between the first node and a first power supply; a comparator receiving the potential of the first node with a reference voltage and having an output connected to a gate of the reset transistor; a counter connected to an output end of the comparator; and a selection transistor connected between an output of the counter and one of the plurality of column signal lines and having a gate connected to one of the plurality of row selection lines,
the method comprising:
causing the photodiode to emit charges according to the incident light;
inverting an output signal from the comparator when the potential of the first node reaches a potential of the first power supply;
causing the counter to count an inversion count of the output signal from the comparator and to output a digital value according to the inversion count, and simultaneously making the reset transistor conductive to reset the potential of the first node to the potential of the first power supply and to return the output signal from the comparator to an original level;
causing the counter not to increase the digital value to make the reset transistor nonconductive, when the output signal from the comparator is returned to the original level; and
outputting the digital value.

10. The method according to claim 9, wherein when a quantity of the incident light is large and a quantity of charges emitted from the photodiode is large, the inversion count counted by the counter for certain time is large, and when the quantity of the incident light is small and the quantity of charges emitted from the photodiode is small, the inversion count counted by the counter for the certain time is small.

11. The image sensor according to claim 9, wherein the counter counts the inversion count at intervals of the certain time, and resets the inversion count and the digital value after the certain time.

12. A method of driving an image sensor, the image sensor including an imaging area including a plurality of pixels arranged in a matrix on a semiconductor substrate and detecting an incident light; a plurality of row selection lines each connected to the pixels arranged in the row direction; and a plurality of column signal lines each connected to the pixels arranged in a column direction,
each of the pixels or each of a plurality of pixel blocks including the pixels including: a photodiode; a capacitor connected to one end of the photodiode at a first node; a reset transistor connected between the first node and a first power supply; a comparator receiving the potential of the first node with a reference voltage and having an output connected to a gate of the reset transistor; a counter connected to an output end of the comparator and receiving clocks having regularly repetitive amplitudes; and a selection transistor connected between an output of the counter and one of the plurality of column signal lines and having a gate connected to one of the plurality of row selection lines, the method comprising:

causing the photodiode to emit charges according to the incident light;

inverting an output signal from the comparator when the potential of the first node reaches a potential of the first power supply;

causing the counter to count an inversion count of the output signal from the comparator and to count the clocks received by time the inversion count reaches a predetermined number, and making the reset transistor conductive simultaneously with the inversion of the output of the comparator;

resetting the potential of the first node to the potential of the first power supply to return the output signal from the comparator to an original level;

causing the counter not to increase the digital value to make the reset transistor nonconductive, when the output signal from the comparator is returned to the original level; and causing the counter to output the digital value according to the number of the clocks received by time the inversion count reaches a predetermined number.

* * * * *